(12) United States Patent
Ohtsuka et al.

(10) Patent No.: US 7,300,640 B2
(45) Date of Patent: Nov. 27, 2007

(54) METHOD FOR CLARIFYING EXHAUST GAS

(75) Inventors: Kenji Ohtsuka, Kanagawa (JP); Satoshi Arakawa, Kanagawa (JP); Koshi Ochi, Kanagawa (JP)

(73) Assignee: Japan Pionics Co., Ltd., Tokyo (JP)

( * ) Notice: Subject to any disclaimer, the term of this patent is extended or adjusted under 35 U.S.C. 154(b) by 437 days.

(21) Appl. No.: 10/516,826

(22) PCT Filed: May 16, 2003

(86) PCT No.: PCT/JP03/06127

§ 371 (c)(1),
(2), (4) Date: Dec. 7, 2004

(87) PCT Pub. No.: WO03/103806

PCT Pub. Date: Dec. 18, 2003

(65) Prior Publication Data

US 2005/0201915 A1    Sep. 15, 2005

(30) Foreign Application Priority Data

Jun. 7, 2002    (JP) .............................. 2002-166672

(51) Int. Cl.
  *B01D 53/56* (2006.01)
  *B01D 53/72* (2006.01)
(52) U.S. Cl. ................ 423/210; 423/239.1; 423/245.1; 423/245.3
(58) Field of Classification Search ................ 423/210, 423/239.1, 245.1, 245.3
See application file for complete search history.

(56) References Cited

U.S. PATENT DOCUMENTS 3,867,508 A * 2/1975 Hass ........................ 423/213.7
3,907,714 A * 9/1975 Compton et al. ........... 502/304
3,916,805 A * 11/1975 Kalfadelis et al. .......... 110/345

FOREIGN PATENT DOCUMENTS

| CN | 1330213 A | 1/2002 |
|---|---|---|
| DE | 35 29 060 | 2/1987 |
| EP | 0 288 746 | 11/1988 |
| EP | 0 643 988 | 3/1995 |
| JP | 52-106363 | 9/1977 |
| JP | 61-274748 | 12/1986 |
| JP | 04-285563 | 10/1992 |
| JP | 07-185344 | 7/1995 |

(Continued)

OTHER PUBLICATIONS

The English abstract of EP 547,934 A1 published on Jun. 23, 1993.*

(Continued)

*Primary Examiner*—Timothy C. Vanoy
(74) *Attorney, Agent, or Firm*—Antonelli, Terry, Stout & Kraus, LLP.

(57) ABSTRACT

A cleaning process of exhaust gas which includes the steps of bringing the exhaust gas containing at least one of nitrogen oxides or organic solvent into contact with a cleaning agent including metal as a reductive cleaning agent component and metal oxide as an oxidative cleaning agent component or including lower valent metal oxide as a reductive cleaning agent component and higher valent metal oxide as an oxidative cleaning agent component while heating them. A cleaning process of exhaust gas containing nitrogen oxides and/or organic solvent with high and varying concentration discharged from a manufacturing process of semiconductor capable of easily cleaning at relatively low temperature and with high decomposition factor without using large-scale cleaning apparatus or a complicated structural cleaning apparatus is provided.

32 Claims, 3 Drawing Sheets

FOREIGN PATENT DOCUMENTS

| | | |
|---|---|---|
| JP | 08-257351 | 10/1996 |
| JP | 09-213596 | 8/1997 |
| JP | 2001-104751 | 4/2001 |

OTHER PUBLICATIONS

European Search Report, dated Sep. 5, 2006, for Application No. EP 03 75 7190.

International Search Report mailed Jun. 24, 2003, for PCT/JP03/06127.

Oxygen Inhibition in the Decomposition of NO on Metal Oxides and Platinum; A. Amimazmi, et al.; Journal of Catalysis 30, 55-65 (1973).

Chinese Official Action, for Application No. 03813161.7, May 12, 2006.

* cited by examiner

METHOD FOR CLARIFYING EXHAUST GAS

TECHNICAL FIELD

The present invention relates to a cleaning process of exhaust gas containing nitrogen oxides and/or organic solvent. More particularly, the present invention pertains to a process of cleaning exhaust gas containing nitrogen oxides and/or organic solvent with high and greatly varying concentration discharged from a manufacturing process of semiconductor.

BACKGROUND ART

Recently in the field of semi-conductors, a lead titanate zirconate (PZT) film, a barium strontium titanate (BST) film, a tantalic acid strontium bismuth (SBT) film, a titanic acid zirconate lantern lead (PLZT) film, etc., each having a high dielectric constant and also a high step coverage has been used as an oxide-based dielectric film for a semiconductor memory. As a manufacturing method of the dielectric film, feeding organic metal ingredient gas and oxidized gas to the semi-conductor manufacturing equipment holding a substrate and chemically vapor depositing is generally known. For example, $Pb(DPM)_2$ or so as Pb source, $Zr(DPM)_4$ or so as Zr source, and $Ti(OiPr)_2(DPM)_2$ or so as Ti source are employed as the organic metal ingredient material each being dissolved in organic solvent and made gaseous by a vaporizer, together with employing oxygen, nitrogen dioxide and the like as the oxidized gas in the case where producing PZT film.

In the case where nitrogen dioxide is employed as oxidative gas in the semi-conductor manufacturing, nitrogen oxides and organic solvent are discharged as the exhaust gas along with a slight amount of organometallic compound. Among these components in the exhaust gas, organometallic compounds are easily removed by means of a dry cleaning process at an ordinary temperature or a cold trap and the like because the compounds are contained in a slight amount. On the other hand, because the concentration of nitrogen oxides and organic solvent in the exhaust gas is usually large in the order of several thousands to several tens of thousands ppm extravagantly exceeding environmental criteria and extremely gives adverse effects to human organism and environment, it is necessary to clean the exhaust gas including these prior to discharging the gas into the atmosphere.

Conventionally as the cleaning process of exhaust gas containing nitrogen oxides, there have been a wet process, an adsorption process, a non-catalytic reduction process, a catalytic reduction process, etc. Among these cleaning processes, the wet process cleans the exhaust gas containing nitrogen oxides by making it being absorbed by aqueous alkali absorber directly or after making it easily being absorbable by the aqueous alkali absorber as a result of converting nitrogen oxides in the exhaust gas into nitrogen dioxide with a catalyst. The adsorption process cleans the exhaust gas containing nitrogen oxides by physically or chemically adsorbing nitrogen oxides to an adsorbing agent such as activated carbon, zeolite, etc. The non-catalytic reduction process generally cleans the exhaust gas containing nitrogen oxides by adding reductive gas such as ammonia or the like, and by reductively decomposing nitrogen oxides into nitrogen and water while heating them. The catalytic reduction process is currently popular and generally cleans the exhaust gas containing nitrogen oxides by adding the reductive gas such as ammonia, hydrocarbon or the like, and bringing them into contact with a catalyst comprising metal or metal compound while heating them resulting in reductively decomposing nitrogen oxides into nitrogen and water.

As a cleaning process of exhaust gas containing organic solvent, there is a combustion cleaning process which introduces the exhaust gas containing organic solvent into a flame of combustible gas such as propane or the like and oxygen or air and burns them, or a catalytic cleaning process which adds oxygen or air to the exhaust gas containing organic solvent and then oxidatively decomposes them by bringing them into contact while heating with a catalyst supporting noble metal or metal oxide on an inorganic carrier.

However, the foregoing wet process practically requires converting nitrogen oxide into nitrogen dioxide with the use of catalyst because nitrogen oxide is not easily absorbed by aqueous alkali absorber while nitrogen dioxide is easily absorbed. Accordingly, the wet process had shortcomings of needing large-scale apparatus and hazardous post processing of the absorber after the usage.

Moreover, the foregoing adsorption process had problems that the cleaning capability (throughput of nitrogen oxides per unit amount of an adsorbing agent) was small and that there was an anxiety of adsorbed nitrogen oxides' desorption during adsorption operation depending on the operative condition.

Further, the foregoing non-catalytic reduction process was not suitable for cleaning the exhaust gas containing nitrogen oxides with high concentration discharged from the manufacturing process of semiconductor not only because it was necessary to elevate the temperature of treating the exhaust gas as high as close to 1,000° C., but also because the decomposition factor of reductively decomposing nitrogen oxides into nitrogen and water was around 50 to 60%.

The foregoing catalytic reduction process is a superior cleaning process capable of reductively decomposing nitrogen oxides at relatively low temperature further achieving decomposition factor of 90% or greater. However, in the case where the amount of the reductive gas added in the occasion of cleaning the exhaust gas containing nitrogen oxides of high concentration is small, the decomposition of nitrogen oxides becomes not enough thereby allowing discharge of nitrogen oxides exceeding acceptable concentration. On the contrary, in the case where the amount of the above reductive gas is large, harmful gases such as carbon monoxide, hydrocarbon gas and so on are discharged. Accordingly, it was difficult controlling not to discharge harmful gas in accordance with the foregoing catalytic reduction process applying to cleaning the exhaust gas containing nitrogen oxides with varying condition such as kinds, concentration and the like discharged from the manufacturing process of semiconductor. Furthermore, in the case where organic solvent was contained along with nitrogen oxides in the exhaust gas, it was more difficult controlling to prevent discharging harmful gases.

DISCLOSURE OF THE INVENTION

Therefore, an object of the present invention is to provide a cleaning process of exhaust gas containing nitrogen oxides and/or organic solvent with high and greatly varying concentration discharged from a manufacturing process of semiconductor capable of easily cleaning at relatively low temperature and with high decomposition factor without using large-scale cleaning apparatus or a complicated structural cleaning apparatus.

As a result of extensive researches for overcoming the foregoing problems by the inventors, it was found that bringing the exhaust gas containing nitrogen oxides and/or organic solvent into contact with a cleaning agent comprising metal and metal oxide as effective cleaning agent components or comprising lower valent metal oxide (metal oxide with few valences) and higher valent metal oxide (metal oxide with many valences) as effective cleaning agent components while heating them, conducting both the reduction of nitrogen oxides and the oxidative decomposition of organic solvent, simultaneously detecting a variation of the cleaning agent caused by the increase or decrease with the progress of oxidation-reduction reaction, supplying correction gas when the constitutional ratio deviates from a predetermined control range, and restoring the constitutional ratio within the control range provide the following practical cleaning process. Namely a cleaning process of exhaust gas containing nitrogen oxides and/or organic solvent each even with high concentration or even with greatly varying concentration with a lapse of time respectively discharged from a manufacturing process of semiconductor capable of easily cleaning at relatively low temperature and with high decomposition factor without using large-scale cleaning apparatus or a complicated structural cleaning apparatus is completed. Therefore, a cleaning process of exhaust gas is completed and the object of the present invention was achieved.

In other words, the present invention provides a cleaning process of exhaust gas which comprises the steps of bringing the exhaust gas containing nitrogen oxides and/or organic solvent into contact with a cleaning agent comprising metal or metal oxide as an effective component while heating them, conducting reduction of the nitrogen oxides by metal and/or oxidative decomposition of the organic solvent by metal oxide, simultaneously detecting a variation of a constitutional ratio between metal and metal oxide with the progress of oxidation-reduction reaction, supplying correction gas when the constitutional ratio deviates from a predetermined control range, and restoring the constitutional ratio within the control range.

Further, the present invention provides a cleaning process of exhaust gas which comprises the steps of bringing the exhaust gas containing nitrogen oxides and/or organic solvent into contact with a cleaning agent comprising lower valent metal oxide and higher valent metal oxide as effective components while heating them, conducting reduction of the nitrogen oxides by lower valent metal oxide and/or oxidative decomposition of the organic solvent by higher valent metal oxide, simultaneously detecting a variation of a constitutional ratio between lower valent metal oxide and higher valent metal oxide with the progress of oxidation-reduction reaction, supplying correction gas when the constitutional ratio deviates from a predetermined control range, and restoring the constitutional ratio within the control range.

Furthermore, the present invention provides a cleaning process of exhaust gas which comprises the steps of bringing at least two kinds selected from the exhaust gas containing nitrogen oxides and organic solvent, the exhaust gas containing nitrogen oxides and the exhaust gas containing organic solvent into contact alternatively or at random with a cleaning agent comprising metal and metal oxide as effective components while heating them, conducting reduction of the nitrogen oxides by metal and oxidative decomposition of the organic solvent by metal oxide, simultaneously detecting a variation of a constitutional ratio between metal and metal oxide with the progress of oxidation-reduction reaction, supplying correction gas when the constitutional ratio deviates from a predetermined control range, and restoring the constitutional ratio within the control range.

Moreover, the present invention provides a cleaning process of exhaust gas which comprises the steps of bringing at least two kinds selected from the exhaust gas containing nitrogen oxides and organic solvent, the exhaust gas containing nitrogen oxides and the exhaust gas containing organic solvent into contact alternatively or at random with a cleaning agent comprising lower valent metal oxide and higher valent metal oxide as effective components while heating them, conducting reduction of the nitrogen oxides by lower valent metal oxide and oxidative decomposition of the organic solvent by higher valent metal oxide, simultaneously detecting a variation of a constitutional ratio between lower valent metal oxide and higher valent metal oxide with the progress of oxidation-reduction reaction, supplying correction gas when the constitutional ratio deviates from a predetermined control range, and restoring the constitutional ratio within the control range.

PREFERRED EMBODIMENT TO CARRY OUT THE INVENTION

Figure 1A:
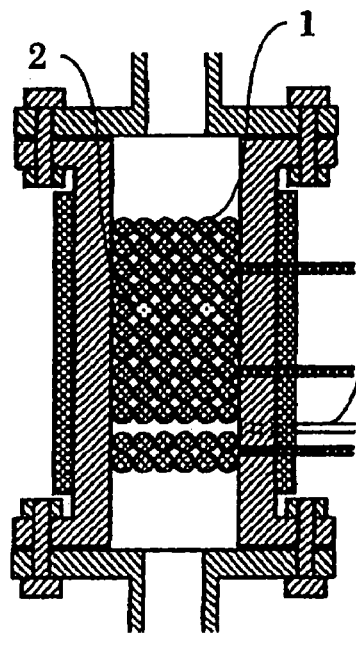
FIG. 1A to FIG. 1D are cross sectional views of one embodiment of a cleaning column used in accordance with the cleaning process of the present invention and illustrate the state of the cleaning agent component varying from FIG. 1A to FIG. 1D along with a lapse of time after reductive exhaust gas is introduced.

The cleaning process of exhaust gas in the present invention is applied to clean the exhaust gas such as nitrogen, helium, argon and the like containing nitrogen oxides, organic solvent or nitrogen oxides and organic solvent.

The present invention provides a cleaning process of exhaust gas which comprises the steps of bringing the exhaust gas containing at least one of nitrogen oxides or organic solvent into contact with a cleaning agent comprising metal as a reductive cleaning agent component and metal oxide as an oxidative cleaning agent component or comprising lower valent metal oxide as a reductive cleaning agent component and higher valent metal oxide as an oxidative cleaning agent component while heating them, conducting at least one of reduction of nitrogen oxides by the reductive cleaning agent component or oxidative decomposition of the organic solvent by the oxidative cleaning agent component, simultaneously detecting a variation of a constitutional ratio between the reductive cleaning agent component and the oxidative cleaning agent component with the progress of oxidation-reduction reaction, supplying correction gas when the constitutional ratio deviates from a predetermined control range, and restoring the constitutional ratio within the control range.

Further, the present invention provides a cleaning process of exhaust gas which comprises the steps of bringing at least two kinds selected from the exhaust gas containing nitrogen oxides and organic solvent, the exhaust gas containing nitrogen oxides and the exhaust gas containing organic solvent into contact alternatively or at random with a cleaning agent comprising metal as a reductive cleaning agent component and metal oxide as an oxidative cleaning agent component or comprising lower valent metal oxide as a reductive cleaning agent component and higher valent metal oxide as an oxidative cleaning agent component while heating them, conducting at least one of reduction of nitrogen oxides by the reductive cleaning agent component or oxidative decomposition of organic solvent by the oxidative cleaning agent component, simultaneously detecting a variation of a constitutional ratio between the reductive cleaning agent component and the oxidative cleaning agent component with the progress of oxidation-reduction reaction, supplying correction gas when the constitutional ratio deviates from a predetermined control range, and restoring the constitutional ratio within the control range.

Nitrogen oxides contained in the exhaust gas cleaned by the present invention include $N_2O$, $NO$, $N_2O_3$, $NO_2$, $N_2O_5$ or $NO_3$. The organic solvent contained in the exhaust gas cleaned by the present invention is an organic solvent for dissolving solid organic metal ingredient used as an ingredient of the semi-conductor film and it usually has boiling point at the temperature from 40° C. to 140° C. in an ordinary pressure (about 1 atmospheric pressure). Examples of the solvent include such ethers as propyl ether, methylbutyl ether, ethylpropyl ether, ethylbutyl ether, trimethylene oxide, tetrahydrofuran and tetrahydropyran; such alcohols as methyl alcohol, ethyl alcohol, propyl alcohol and butyl alcohol; such ketones as acetone, ethyl methyl ketone, isopropyl methyl ketone and isobutyl methyl ketone; such esters as ethyl acetate, propyl acetate and butyl acetate; and such hydrocarbons as hexane, heptane and octane.

The cleaning agent employed for the present invention is a cleaning agent comprising metal as the reductive cleaning agent component and metal oxide as the oxidative cleaning agent component or a cleaning agent comprising lower valent metal oxide as the reductive cleaning agent component and higher valent metal oxide as the oxidative cleaning agent component. In the present invention, lower valent metal oxide means metal oxide capable of reducing nitrogen oxides under the condition of temperature and pressure carrying out the cleaning process of exhaust gas, and higher valent metal oxide means metal oxide capable of oxidatively decomposing organic solvent under the condition of temperature and pressure carrying out the cleaning process of exhaust gas. With regard to the combination of these cleaning agent components, Cu and CuO, Ni and NiO, Ru and $RuO_2$ or Ag and $Ag_2O$ may be exemplified as the case of metal and metal oxide; and, MnO and $Mn_2O_3$, FeO and $Fe_2O_3$, CoO and $Co_2O_3$, CrO and $Cr_2O_3$, $MoO_2$ and $MoO_3$ or $Ce_2O_3$ and $CeO_2$ may be exemplified as the case of lower valent metal oxide and higher valent metal oxide.

Further, the cleaning agent component may be in the form of metal, metal oxide, lower valent metal oxide or higher valent metal oxide in the occasion of cleaning the exhaust gas, and it is possible to employ compound such as hydroxide, carbonate or sulfate of metal as an ingredient for the cleaning agent component. In the viewpoint of enabling to maintain the cleaning capability for a long time, these metal and metal oxide, lower valent metal oxide and higher valent metal oxide are preferably used being supported by an inorganic carrier such as alumina, silica, zirconia, titania, silica alumina, diatomaceous earth, etc. Specific surface area of the cleaning agent is usually 10 to 400 $m^2/g$.

The correction gas is used for converting metal into metal oxide, or for converting lower valent metal oxide into higher valent metal oxide in the present invention; and although it is not particularly specified as far as it is oxidative gas having capability of oxidizing metals or lower valent metal oxides, oxygen or air is usually employed as the correction gas. Further, the other correction gas is used for converting metal oxide into metal, or for converting higher valent metal oxide into lower valent metal oxide in the present invention; and it is not particularly specified as far as it is reductive gas having capability of reducing metal oxides or higher valent metal oxides. However, hydrogen; ethers such as propyl ether, methylbutyl ether, ethylpropyl ether, ethylbutyl ether, trimethylene oxide, tetrahydrofuran and tetrahydropyran; alcohols such as methyl alcohol, ethyl alcohol, propyl alcohol and butyl alcohol; ketones such as acetone, ethyl methyl ketone, isopropyl methyl ketone and isobutyl methyl ketone; esters such as ethyl acetate, propyl acetate, butyl acetate; hydrocarbons such as hexane, heptane and octane and the like are usually employed as the above correction gas. It is necessary that the foregoing ingredients for the correction gas are in the state of gas under the condition of the temperature and the pressure in the cleaning process of exhaust gas.

The exhaust gas aimed to be cleaned in accordance with the present invention is usually any one of reductive exhaust gas containing nitrogen oxide and organic solvent, oxidative exhaust gas containing nitrogen oxide and organic solvent, reductive exhaust gas containing organic solvent, or oxidative exhaust gas containing nitrogen oxides. The cleaning process of the present invention is particularly effective for the exhaust gas containing nitrogen oxide in an amount of 100 to 50,000 ppm and/or organic solvent in an amount of 100 to 5,000 ppm. In the present invention, the reductive exhaust gas is defined as the exhaust gas in which more reductive gas is contained as chemical equivalent than oxidative gas; and the oxidative exhaust gas is defined as the exhaust gas in which more oxidative gas is contained as chemical equivalent than reductive gas.

The cleaning process of exhaust gas according to the present invention will be described in further detail with reference to FIGS. 1 to 3, which does not limit the scope of the invention.

FIGS. 1 and 2 are cross sectional views of embodiments of cleaning column used in accordance with the cleaning process of the present invention and respectively illustrate the state of the cleaning agent component varying from (A) to (D) along with a lapse of time after introducing the reductive exhaust gas or the oxidative exhaust gas. Further, FIGS. 1 and 2 illustrate the embodiments of the cleaning column in a detecting system about variation of the constitution ratio of the cleaning agent component by gas analysis. FIG. 3 is a block diagram showing one embodiment of cleaning system with the use of the cleaning column shown in FIG. 1 or FIG. 2.

The cleaning process of exhaust gas in accordance with the present invention will be explained below with regard to the case mainly with the use of the cleaning agent comprising metal and metal oxide as an effective component, however, the case with the use of the cleaning agent comprising lower valent metal oxide and higher valent metal oxide as an effective component is similarly conducted.

In the case where the reductive exhaust gas is cleaned in the present invention, namely, in the case where the reductive exhaust gas containing nitrogen oxide and organic solvent or the reductive exhaust gas containing organic solvent is cleaned, it is preferable that metal oxide 1 (or, higher valerit metal oxide 1) is filled in the cleaning column in more amount than metal 2 (or, lower valent metal oxide 2) as shown in FIG. 1A before conducting the cleaning process. Heating the cleaning agent by a heater 4 and after recognizing that the temperature of the cleaning agent reached to the predetermined value by a temperature sensor 5, introduce the reductive exhaust gas containing nitrogen oxides and organic solvent into the cleaning column, then, nitrogen oxide is reduced to metal 2 (or, lower valent metal oxide 2) and organic solvent is oxidatively decomposed by metal oxide 1 (or, higher valent metal oxide 1), together with metal oxide 1 (or, higher valent metal oxide 1) decreases and metal 2 (or, lower valent metal oxide 2) increases. On the other hand, when the reductive exhaust gas containing organic solvent is introduced into the cleaning column after heating the cleaning agent to the predetermined temperature, organic solvent is oxidatively decomposed by metal oxide 1 (or, higher valent metal oxide 1) together with metal oxide 1 (or, higher valent metal oxide 1) decreases, and metal 2 (or, lower valent metal oxide 2) increases.

For example, when the reductive exhaust gas containing nitrogen dioxide and cyclohexane is brought into contact with a cleaning agent consisting of Cu and CuO while heating, it is supposed that the reaction of the chemical equations (1) to (3) below occur. Accordingly, the exhaust gas is cleaning processed and $CO_2$, $H_2O$ and $N_2$ are discharged from exhaust outlet of the cleaning column, and because more reductive gas is contained as chemical equivalent than oxidative gas in the exhaust gas, CuO decreases and Cu increases along with a lapse of time.

Further for example, when the reductive exhaust gas containing nitrogen dioxide and methanol is brought into contact with a cleaning agent consisting of CrO and $Cr_2O_3$ while heating, it is supposed that the reaction of the chemical equations (4) to (6) below occur.

Regarding with an oxidation-reduction reaction in the case where a cleaning agent comprising other metals and other metal oxides as an effective component, or the cleaning agent comprising other lower valent metal oxide and other higher valent metal oxide as the effective component is employed, it is supposed to be similar with the reaction of chemical equations (1) to (6).

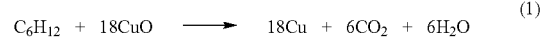
(1)

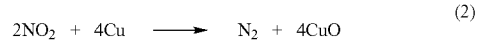
(2)

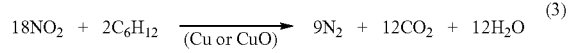
(3)

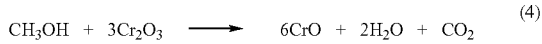
(4)

(5)

(6)

Figure 1B:
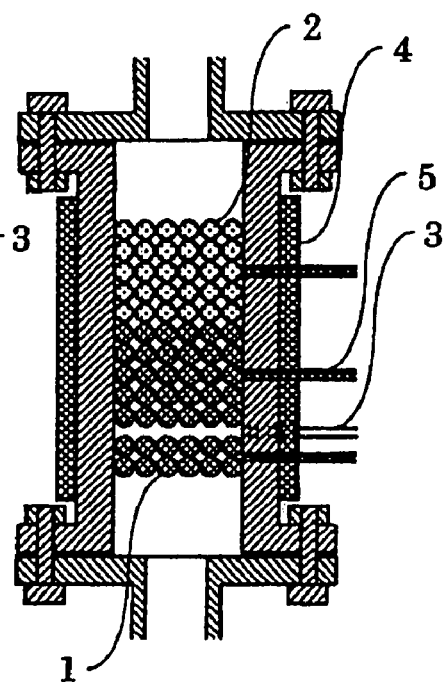
Figure 1C:
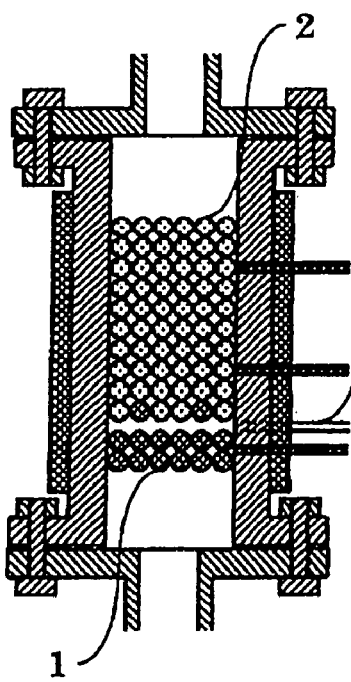
Figure 1D:
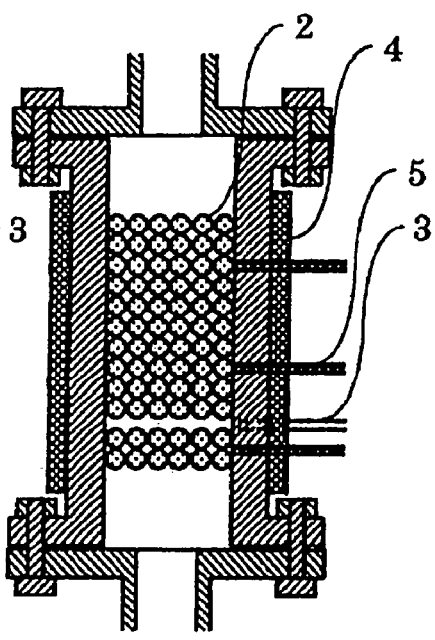

Accordingly, when the reductive exhaust gas is cleaned continuously, the state of the cleaning agent varies with the state as shown in FIGS. 1B and 1C, further results in the state as shown in FIG. 1D thereby discharging harmful reductive gases such as CO and the like from the exhaust outlet. Therefore, in the case where the reductive gas is cleaned, the reductive gas is sampled and analyzed by providing a gas sampling pipe 3 as shown in FIG. 1, and when the reductive gas is detected, namely, when the state of the cleaning agent become as shown in FIG. 1C, metal 2 (or, lower valent metal oxide 2) is oxidized by discontinuing the introduction of the exhaust gas and supplying only oxidative correction gas to the cleaning column, or by supplying the oxidative correction gas to the cleaning column together with the exhaust gas, and then the state of the cleaning agent is restored to the state as shown in FIG. 1A. In the present invention, a continuation of the cleaning process of exhaust gas for a long time become possible by repeating the above cleaning steps cyclically. Additionally, with regard to the cleaning agent in the present invention, it is preferable to employ a cleaning agent prepared by supporting copper and copper oxide on an inorganic carrier in the standpoint of extremely little degradation or decreasing of cleaning capability after a repeated oxidation and reduction.

Further in the present invention, instead of detecting the variation of the constitutional ratio of the cleaning agent by sampling, the detecting may be carried out, for example, by sensing the color change of a detecting agent caused by the reductive gas. The detecting agent may be filled in downstream stratum of the cleaning agent, in a pipe at downstream side of the cleaning agent, or in a by-pass pipe disposed at downstream stratum of the cleaning agent. Furthermore, the detection of the constitutional ratio of the cleaning agent is possible by measuring the variation of the electric resistance of the cleaning agent. Still further, the detection of the constitutional ratio of the cleaning agent is possible by calculation from the treated amount of the exhaust gas.

In the case where the reductive exhaust gas containing organic solvent or the reductive exhaust gas containing nitrogen oxide and organic solvent is cleaned, the controlling range of constitutional ratio between the metal (or, lower valent metal oxide) and the metal oxide (or, higher valent metal oxide) in the cleaning agent is preferable to be in the range from 5/95 to 95/5 by mole ratio in the cleaning process employing what sorts of the cleaning agent.

Figure 2A:
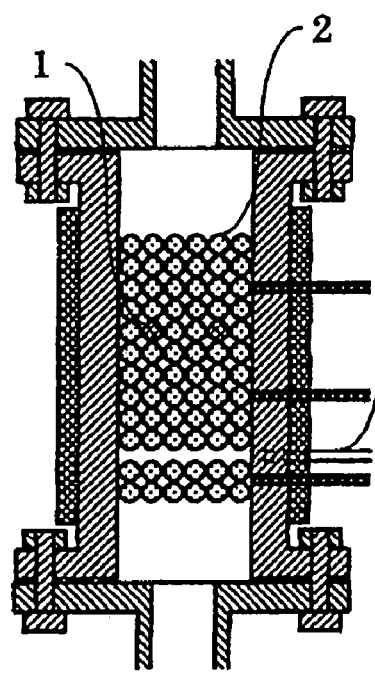
FIG. 2A to FIG. 2D are cross sectional views of one embodiment of a cleaning column used in accordance with the cleaning process of the present invention and illustrate the state of the cleaning agent component varying from FIG. 2A to FIG. 2D along with a lapse of time after oxidative exhaust gas is introduced.

In the case where the oxidative exhaust gas is cleaned in the present invention, namely, in the case where the oxidative exhaust gas containing nitrogen oxide and organic solvent or the oxidative exhaust gas containing nitrogen oxide is cleaned, it is preferable that metal 2 (or, lower valent metal oxide 2) is filled in the cleaning column in more amount than metal oxide 1 (or, higher valent metal oxide 2) as shown in FIG. 2A before conducting the cleaning process. Heating the cleaning agent by the heater 4 and after recognizing that the temperature of cleaning agent reached to the predetermined value by the temperature sensor 5, introduce the oxidative exhaust gas containing nitrogen oxide and organic solvent into the cleaning column, then, nitrogen oxide is reduced to metal 2 (or, lower valent metal oxide 2) and organic solvent is oxidatively decomposed by metal oxide 1 (or, higher valent metal oxide 1), together with metal oxide 1 (or, higher valent metal oxide 1) increases and metal 2 (or, lower valent metal oxide 2) decreases. On the other hand, when the oxidative exhaust gas containing nitrogen oxide is introduced into the cleaning column after heating the cleaning agent to the predetermined temperature, nitrogen oxide is reduced by metal 2 (or, lower valent metal oxide 2) together with metal oxide 1 (or, higher valent metal oxide 1) increases, and metal 2 (or, lower valent metal oxide 2) decreases.

For example, when the oxidative exhaust gas containing nitrogen dioxide and cyclohexane is brought into contact with a cleaning agent consisting of copper oxide and metallic copper while heating, it is supposed that the reaction of the foregoing chemical equations (1) to (3) occur. Accordingly, the exhaust gas is cleaning processed and $CO_2$, $H_2O$ and $N_2$ are discharged from exhaust outlet of the cleaning column, and because more oxidative gas is contained as chemical equivalent than reductive gas in the exhaust gas, copper oxide increases and metallic copper decreases along with a lapse of time. On the other hand, when the oxidative exhaust gas containing nitrogen dioxide is brought into contact with the cleaning agent consisting of copper oxide and metallic copper while heating, it is supposed that the reaction of the foregoing chemical equations (2) occur, and with a lapse of time, copper oxide increases and metallic copper decreases.

Figure 2B:
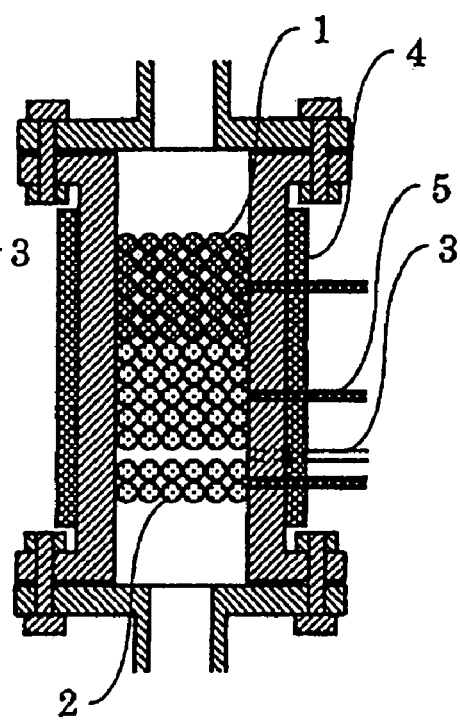
Figure 2C:
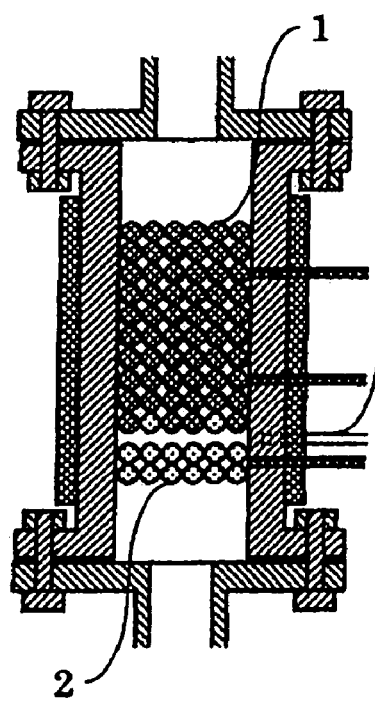
Figure 2D:
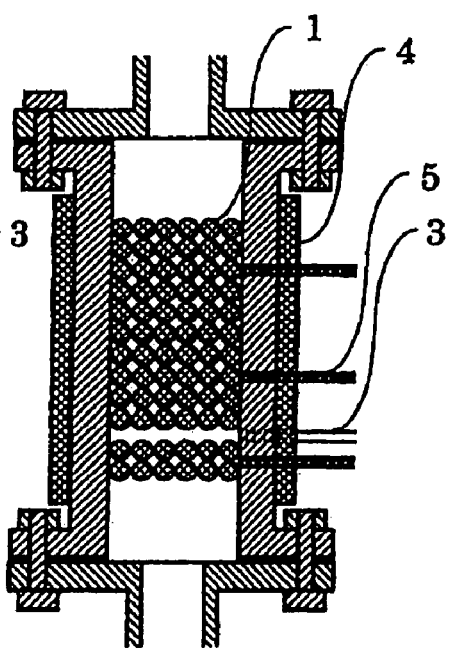

Accordingly, when the oxidative exhaust gas is cleaned continuously, the state of the cleaning agent varies with the state as shown in FIGS. 2B and 2C, further results in the state as shown in FIG. 2D thereby discharging the harmful nitrogen oxide from the exhaust outlet. Therefore, in the case where the oxidative gas is cleaned, the oxidative gas is sampled and analyzed by providing the gas sampling pipe 3 as shown in FIG. 2, and when the nitrogen oxide is detected, namely, when the state of the cleaning agent become as shown in FIG. 2C, metal oxide 1 (or, higher valent metal oxide 1) is reduced by discontinuing the introduction of the exhaust gas and supplying only the reductive correction gas to the cleaning column, or by supplying the reductive correction gas to the cleaning column together with the exhaust gas, and then the state of the cleaning agent is restored to the state as shown in FIG. 2A. In the present invention, a continuation of the cleaning process of exhaust gas for a long time become possible by repeating the above cleaning steps cyclically.

In the cleaning process of the oxidative exhaust gas according to the present invention, instead of detecting the variation of the constitutional ratio of the cleaning agent by sampling, the detecting may be carried out by sensing the color change of the detecting agent, by measuring the variation of the electric resistance of the cleaning agent, or by calculation from the treated amount of the exhaust gas, etc. Further, the controlling range of constitutional ratio between the metal (or, lower valent metal oxide) and the metal oxide (or, higher valent metal oxide) in the cleaning agent is preferable to be in the range from 5/95 to 95/5 by mole ratio in the cleaning process employing what sorts of the cleaning agent.

Additionally, the introduction rate of the exhaust gas is usually 10 to 100,000 ml/min, preferably 100 to 100,00 ml/min at the temperature of 25° C. and under 1 atmospheric pressure either in the case of the reductive exhaust gas or in the case of the oxidative exhaust gas in the cleaning process of exhaust gas according to the present invention. With regard to the temperature bringing the exhaust gas into contact with the cleaning agent, it is usually 100 to 800° C., and preferably 200 to 700° C. The supplying rate of the correction gas is usually 10 to 5,000 ml/min, and preferably 50 to 2,000 ml/min at the temperature of 25° C. under 1 atmospheric pressure. Further, the pressure at the cleaning step is not particularly specified, and although it is usually an ordinary pressure, for example, operation in the range from under reduced pressure like 1 KPa to under compressed pressure like 200 KPa may be practical. Moreover, the decomposition factor of nitrogen oxide or organic solvent in the cleaning process of exhaust gas according to the present invention is at least 99.9%.

In the present invention, a cleaning process of exhaust gas which comprises the steps of introducing at least two kinds selected from the foregoing exhaust gas containing nitrogen oxides and organic solvent, the foregoing exhaust gas containing nitrogen oxides and the foregoing exhaust gas containing organic solvent alternatively or at random into a cleaning column filled with a cleaning agent comprising metal and metal oxide as effective components or a cleaning agent comprising lower valent metal oxide and higher valent metal oxide as effective components; simultaneously detecting the variation of the constitutional ratio of the cleaning agent similarly as the foregoing description; supplying correction gas when the constitutional ratio deviates from a predetermined control range; and restoring the constitutional ratio within the control range is impossible. In such a cleaning process, the detection of the variation of the constitutional ratio of the cleaning agent may be carried out by sampling the exhaust gas, by sensing the color change of the detecting agent, by measuring the variation of the electric resistance of the cleaning agent, or by calculation from the treated amount of the exhaust gas, etc. However, in the case where the kinds of the exhaust gas frequently replace, or in the case where the concentration of nitrogen oxides and organic solvent in the exhaust gas fluctuate greatly in a short time, it is preferable that the detection should be carried out by the other way except the detection by calculation from the treated amount of the exhaust gas.

Figure 3:
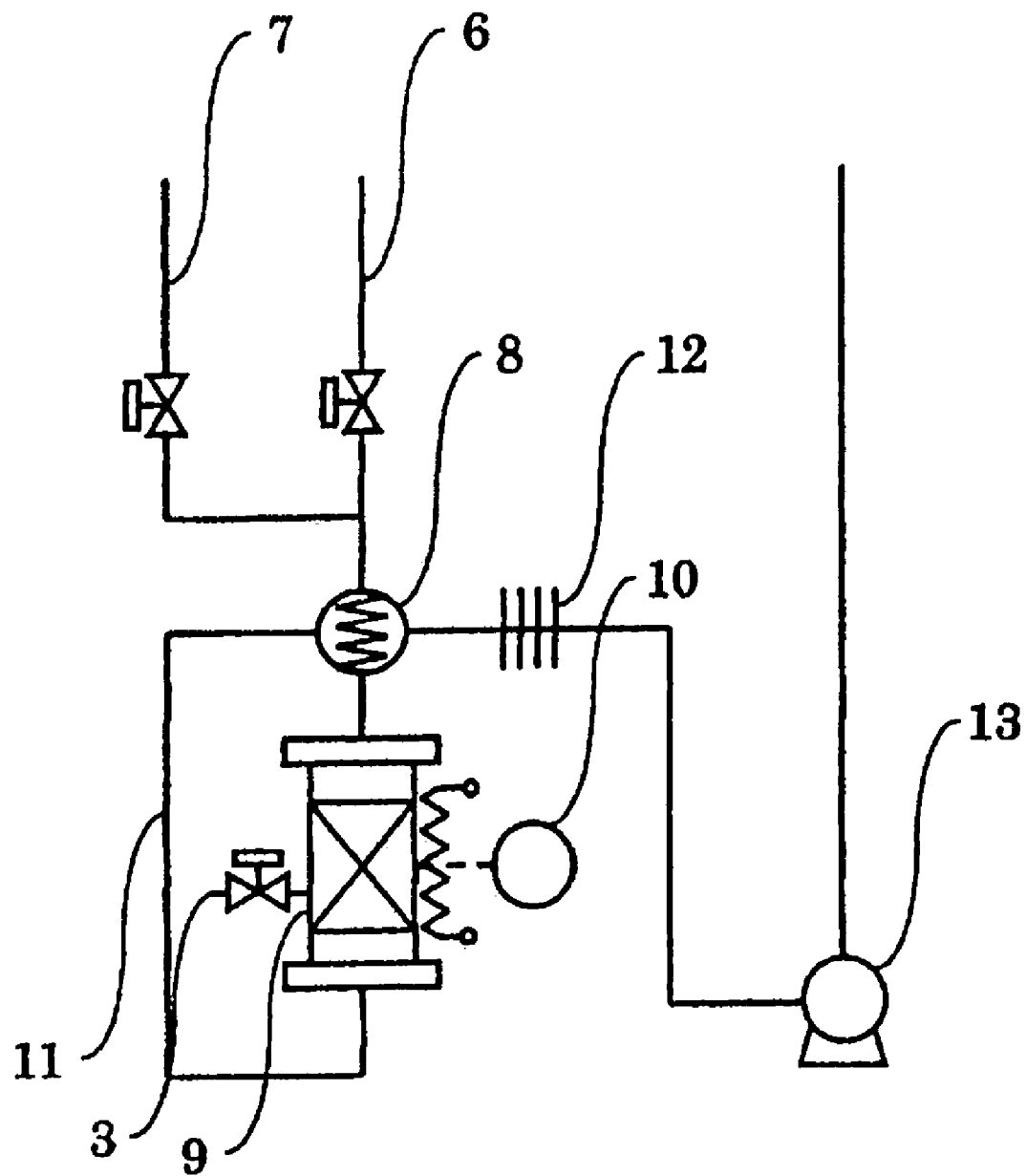
FIG. 3 is a block diagram showing one embodiment of cleaning system for carrying out the cleaning process of exhaust gas in accordance with the present invention.

FIG. 3 is a block diagram showing one embodiment of cleaning system for carrying out the present invention. The exhaust gas fed from semiconductor manufacturing apparatus is introduced through an exhaust gas introduction pipeline 6 via a heat exchanger 8 into the cleaning column 9 filled with the cleaning agent. The cleaning temperature is maintained in an appropriate range by means of a temperature regulator 10. By gathering the gas through the gas sampling pipe 3 and by analyzing, the variation of the constitutional ratio of the cleaning agent is detected, and when the constitutional ratio deviates from the predetermined control range, the constitutional ratio should be restored within the control range by supplying the correction gas through the correction gas introducing pipeline 7. The cleaned exhaust gas is guided outside of the cleaning system via an exhaust pipeline 11, a cooler 12 and a blower 13.

As described above, because metal and metal oxide, or lower valent metal oxide and higher valent metal oxide are employed as the cleaning agent component, and because the constitutional ratio of the cleaning agent is maintained in the predetermined control range in the present invention, enough time is remained before harmful gases such as nitrogen oxides or the reductive gas and the like are discharged after the constitutional ratio goes outside the control range even though, for example, the concentration of nitrogen oxide or organic solvent among the exhaust gas greatly deviates. Accordingly, controlling the constitutional ratio in order to prevent discharging harmful gases is easily conducted.

The present invention shall be explained below in further details with reference to examples, but the present invention shall by no means be limited by the following examples.

EXAMPLE 1

(Preparation of Cleaning Agent)

A solution made by dissolving 500 g of commercially available formic acid copper (II) into 400 ml of aqueous solution of ammonia with concentration of 28% by weight was impregnated to 900 g of spherical alumina with particle diameters of 2 to 3 mm and with specific surface of 200 $m^2$/g and then, the spherical alumina were dried and sintered at the temperature of 500° C. for two hours. The solution of the formic acid copper (II) in the aqueous solution of ammonia was impregnated again to the obtained spherical alumina and then, they were dried and sintered to prepare a cleaning agent consisting of CuO of 20% by weight supported by the spherical alumina carrier.

(Cleaning Test)

The resultant cleaning agent were filled into a cleaning column made of SUS 316L having the inner diameter of 16.4 mm and with a gas sampling pipe in a manner that the gas sampling pipe was located at the position of 1/10 from the bottom of the cleaning agent stratum. (filling length: 200 mm, control range of Cu/CuO in the cleaning agent: 10/90-90/10) Subsequently, the temperature of the cleaning agent in the cleaning column was elevated to 500° C. by heating, and reduction of CuO was carried out by flowing hydrogen through the cleaning column and then, oxidative gas containing 1,000 ppm of $NO_2$ in dried nitrogen and oxidative gas containing 10,000 ppm of $NO_2$ in dried nitrogen were alternatively flown through the cleaning column at the flow rate of 1,000 ml/min (at the temperature of 25° C., under ordinary pressure) for 5 minutes. Meanwhile, one part of the gas in the cleaning column was sampled through the gas sampling pipe and measured the time (effective operation time) before nitrogen oxide is detected with the use of a gas detector tube (available from Gastec Corporation, lower detecting limit: 0.1 ppm) and determined the removal amount (L) (cleaning capability) of $NO_2$ per L (litter) of the cleaning agent. The results are shown in Table 1.

(Restoration of the Constitutional Ratio of the Cleaning Agent and the Second or the Latter Cleaning Test)

Immediately after nitrogen oxide was detected in the gas sampling pipe of the cleaning column, excess of $C_2H_5OH$ together with $NO_2$ were supplied as the correction gas into the cleaning column, and $C_2H_5OH$ was continued to be supplied until the reductive gas was detected in the gas sampling pipe of the cleaning column. Afterwards, the supply of the correction gas was discontinued and then, the same cleaning test was repeated again. The results are shown in Table 1.

The foregoing cleaning test was further repeated three times, and the results are shown in Table 1.

Additionally, with regard to the gas discharged from the exhaust outlet of the cleaning column, a part of which is sampled during the cleaning test and then, detection of harmful gas (nitrogen oxide or reductive gas) was tried with the use of the gas detection tube, however, any harmful gas was not detected.

EXAMPLE 2

(Cleaning Test)

The cleaning agent prepared in the same way as Example 1 were filled into a cleaning column made of SUS 316L having the inner diameter of 16.4 mm and with two electrode terminals located at the position of 1/5 from the bottom of the cleaning agent stratum. (filling length: 200 mm, control range of Cu/CuO in the cleaning agent: 20/80-80/20) Subsequently, the temperature of the cleaning agent in the cleaning column was elevated to 500° C. by heating and then, reductive gas containing 3,000 ppm of $C_6H_{12}$ in dried nitrogen was flown through the cleaning column at the flow rate of 1,000 ml/min (at the temperature of 25° C., under ordinary pressure). Meanwhile, the electric resistance of the cleaning agent was measured by applying voltage across the foregoing two electrode terminals and at the same time, also measured the time (effective operation time) before the resistance suddenly decreased and determined the removal amount (L) (cleaning capability) of $C_6H_{12}$ per L (litter) of the cleaning agent. The results are shown in Table 1.

(Restoration of the Constitutional Ratio of the Cleaning Agent and the Second or the Latter Cleaning Test)

Immediately after the electric resistance of the cleaning agent suddenly decreased, excess of oxygen together with $C_6H_{12}$ were supplied as the correction gas into the cleaning column, and oxygen was continued to be supplied until the electric resistance of the cleaning agent suddenly increased. Afterwards, the supply of the correction gas was discontinued and then, the same cleaning test was repeated again. The results are shown in Table 1.

The foregoing cleaning test was further repeated three times, and the results are shown in Table 1.

Additionally, with regard to the gas discharged from the exhaust outlet of the cleaning column, a part of which is sampled during the cleaning test and then, detection of harmful gas (reductive gas) was tried with the use of the gas detection tube, however, any harmful gas was not detected.

EXAMPLE 3

Example 3 was conducted similarly as Example 1 except that the oxidative gas containing $NO_2$ was replaced by the oxidative gas containing NO in the cleaning test. The results are shown in Table 1.

Additionally, with regard to the gas discharged from the exhaust outlet of the cleaning column, a part of which is sampled during the cleaning test and then, detection of harmful gas (nitrogen oxide or reductive gas) was tried with the use of the gas detection tube, however, any harmful gas was not detected.

As shown in Table 1, even a repetition of the cleaning cycle exhibits reappearance of the cleaning capability (L/L agent: liter per litter of the cleaning agent) in the present invention. Accordingly, without carrying out the analysis or so about the gases discharged from the exhaust outlet of the cleaning column, the cleaning process may be conducted based on only the calculation from the processed amount of the exhaust gas.

TABLE 1

| | Gas to be treated | Cleaning capability (L/L agent) | | | | |
|---|---|---|---|---|---|---|
| | | First | Second | Third | Fourth | Fifth |
| Ex. 1 | $NO_2$ | 20 (Time: 139 minutes) | 19 | 20 | 20 | 20 |
| Ex. 2 | $C_6H_{12}$ | 2.0 (Time: 23 minutes) | 2.1 | 2.0 | 2.0 | 2.1 |
| Ex. 3 | NO | 20 (Time: 282 minutes) | 20 | 19 | 20 | 20 |

EXAMPLE 4

(Preparation of Cleaning Agent)

A solution made by dissolving 500 g of commercially available chromium oxide (VI) into 500 ml of water was impregnated to 800 g of spherical alumina with particle diameters of 2 to 3 mm and with specific surface of 200 $m^2/g$. Then, after the spherical alumina were dried, they were sintered at the temperature of 500° C. for two hours, and further, they were reduced and made into the cleaning agent formed by supporting CrO of 20% by weight on the spherical alumina as the carrier.

(Cleaning Test)

The resultant cleaning agent were filled into a cleaning column made of SUS 316L having the inner diameter of 16.4 mm and with a by-pass pipe having the inner diameter of 4.0 mm in a manner that an inlet of the by-pass pipe was located at the position of 1/10 from the bottom of the cleaning agent stratum. (filling length: 200 mm, control range of CrO/$Cr_2O_3$ in the cleaning agent: 10/90-90/10) The gas introduced into the by-pass pipe was settled to join with the gas discharged from the cleaning column at the latter stage of the cleaning column. Additionally, the by-pass pipe has a transparent section made of ceramic. Subsequently, filling a detective agent, whose color changes caused by the existence of nitrogen oxide, into the transparent section of the by-pass pipe, the temperature of the cleaning agent in the cleaning column was elevated to 500° C. by heating and then, oxidative gas containing 10,000 ppm of $NO_2$ in dried nitrogen was flown through the cleaning column at the flow rate of 1,000 ml/min (at the temperature of 25° C., under ordinary pressure). Meanwhile, the detective agent in the by-pass pipe was monitored and at the same time, also measured the time (effective operation time) before nitrogen oxide is detected by the change of the color of the detective agent and determined the removal amount (L) (cleaning capability) of $NO_2$ per L (litter) of the cleaning agent. As a result, the cleaning capability was 8.2 L/L agent.

EXAMPLE 5

The cleaning agent prepared in the same way as Example 1 were filled into the cleaning column made of SUS 316L having the inner diameter of 16.4 mm and with the gas sampling pipe in a manner that the gas sampling pipe was located at the position of 1/10 from the bottom of the cleaning agent stratum. (filling length: 200 mm, control range of Cu/CuO in the cleaning agent: 10/90-90/10) Subsequently, the temperature of the cleaning agent in the cleaning column was elevated to 500° C. by heating and then, reductive gas containing 10,000 ppm of $NO_2$ and 2,000 ppm of $C_6H_{12}$ in dried nitrogen was flown through the cleaning column at the flow rate of 1,000 ml/min (at the temperature of 25° C., under ordinary pressure). Meanwhile, one part of the gas in the cleaning column was sampled through the gas sampling pipe and measured the time before the reductive gas was detected with the use of a gas detector tube (available from Gastec Corporation, lower detecting limit: 1.0 ppm). As a result, the time was 91 minutes.

Immediately after the reductive gas was detected in the gas sampling pipe of the cleaning column, excess oxygen together with $NO_2$ and $C_6H_{12}$ were supplied as the correction gas into the cleaning column, and oxygen was continued to be supplied until nitrogen oxide was detected in the gas sampling pipe of the cleaning column.

Afterwards, the supply of the correction gas was discontinued and then, the same cleaning test was repeated again. The foregoing cleaning test was further repeated three times, however, any harmful gas (nitrogen oxides or reductive gas) was not detected among the exhaust gas from exhaust outlet of the cleaning column.

EXAMPLE 6

The cleaning agent prepared in the same way as Example 1 were filled into the cleaning column made of SUS 316L having the inner diameter of 16.4 mm and with the gas sampling pipe in a manner that the gas sampling pipe was located at the position of 1/10 from the bottom of the cleaning agent stratum. (filling length: 200 mm, control range of Cu/CuO in the cleaning agent: 10/90-90/10) Subsequently, the temperature of the cleaning agent in the cleaning column was elevated to 500° C. by heating and then, oxidative gas containing 10,000 ppm of $NO_2$ in dried nitrogen and reductive gas containing 2,000 ppm of $C_6H_{12}$ in dried nitrogen were alternatively flown through the cleaning column at the flow rate of 1,000 ml/min (at the temperature of 25° C., under ordinary pressure) with the interval of 10 minutes. Meanwhile, one part of the gas in the cleaning column was sampled through the gas sampling pipe and measured the time before the reductive gas was detected with the use of a gas detector tube (available from Gastec Corporation, lower detecting limit: 1.0 ppm). As a result, the time was 178 minutes.

Immediately after the reductive gas was detected in the gas sampling pipe of the cleaning column, excess oxygen together with $NO_2$ and $C_6H_{12}$ were supplied as the correction gas into the cleaning column, and oxygen was continued to be supplied until nitrogen oxide was detected in the gas sampling pipe of the cleaning column.

Afterwards, the supply of the correction gas was discontinued and then, the same cleaning test was repeated again. The foregoing cleaning test was further repeated three times, however, any harmful gas (nitrogen oxides or reductive gas) was not detected among the exhaust gas from the exhaust outlet of the cleaning column.

EXAMPLE 7

The cleaning agent prepared in the same way as Example 4 were filled into the cleaning column made of SUS316L having the inner diameter of 16.4 mm and with the gas sampling pipe in a manner that the gas sampling pipe was located at the position of 1/10 from the bottom of the cleaning agent stratum. (filling length: 200 mm, control range of $CrO/Cr_2O_3$ in the cleaning agent: 10/90-90/10) Subsequently, the temperature of the cleaning agent in the cleaning column was elevated to 500° C. by heating and then, oxidative gas containing 10,000 ppm of $NO_2$ and 500 ppm of $C_6H_{12}$ in dried nitrogen was flown through the cleaning column at the flow rate of 1,000 ml/min (at the temperature of 25° C., under ordinary pressure). Meanwhile, one part of the gas in the cleaning column was sampled through the gas sampling pipe and measured the time before nitrogen oxide was detected with the use of a gas detector tube (available from Gastec Corporation, lower detecting limit: 0.1 ppm). As a result, the time was 52 minutes.

Immediately after nitrogen oxide was detected in the gas sampling pipe of the cleaning column, excess of $C_2H_5OH$ together with $NO_2$ and $C_6H_{12}$ were supplied as the correction gas into the cleaning column, and $C_2H_5OH$ was continued to be supplied until the reductive gas was detected in the gas sampling pipe of the cleaning column.

Afterwards, the supply of the correction gas was discontinued and then, the same cleaning test was repeated again. The foregoing cleaning test was further repeated three times, however, any harmful gas (nitrogen oxides or reductive gas) was not detected among the exhaust gas from the exhaust outlet of the cleaning column.

EXAMPLE 8

The cleaning agent prepared in the same way as Example 4 were filled into the cleaning column made of SUS316L having the inner diameter of 16.4 mm and with the gas sampling pipe in a manner that the gas sampling pipe was located at the position of 1/10 from the bottom of the cleaning agent stratum. (filling length: 200 mm, control range of $CrO/Cr_2O_3$ in the cleaning agent: 10/90-90/10) Subsequently, the temperature of the cleaning agent in the cleaning column was elevated to 500° C. by heating and then, oxidative gas containing 10000 ppm of $NO_2$ in dried nitrogen and reductive gas containing 500 ppm of $C_6H_{12}$ in dried nitrogen were alternatively flown through the cleaning column at the flow rate of 1,000 ml/min (at the temperature of 25° C., under ordinary pressure) with the interval of 10 minutes. Meanwhile, one part of the gas in the cleaning column was sampled through the gas sampling pipe and measured the time before nitrogen oxide was detected with the use of a gas detector tube (available from Gastec Corporation, lower detecting limit: 0.1 ppm). As a result, the time was 100 minutes.

Immediately after nitrogen oxide was detected in the gas sampling pipe of the cleaning column, excess of $C_2H_5OH$ together with $NO_2$ and $C_6H_{12}$ were supplied as the correction gas into the cleaning column, and $C_2H_5OH$ was continued to be supplied until the reductive gas was detected in the gas sampling pipe of the cleaning column.

Afterwards, the supply of the correction gas was discontinued and then, the same cleaning test was repeated again. The foregoing cleaning test was further repeated three times, however, any harmful gas (nitrogen oxides or reductive gas) was not detected among the exhaust gas from the exhaust outlet of the cleaning column.

INDUSTRIAL APPLICABILITY

In accordance with the present invention, a cleaning process of exhaust gas containing nitrogen oxides and/or organic solvent with high and varying concentration discharged from a manufacturing process of semiconductor capable of easily cleaning at relatively low temperature and with high decomposition factor without using large-scale cleaning apparatus or a complicated structural cleaning apparatus is provided.

What is claimed is:

1. A cleaning process of exhaust gas which comprises the steps of:
    bringing exhaust gas containing at least one of nitrogen oxides or organic solvent into contact with a cleaning agent comprising metal as a reductive cleaning agent component and metal oxide as an oxidative cleaning agent component or comprising lower valent metal oxide as a reductive cleaning agent component and higher valent metal oxide as an oxidative cleaning agent component while heating them, wherein the combination of said metal and said metal oxide is Cu and CuO, Ni and NiO, Ru and $RuO_2$ or Ag and $Ag_2O$, and wherein the combination of said lower valent metal oxide and said higher valent metal oxide is MnO and $Mn_2O_3$, FeO and $Fe_2O_3$, CoO and $Co_2O_3$, CrO and $Cr_2O_3$, $MoO_2$ and $MoO_3$ or $Ce_2O_3$ and $CeO_2$
    conducting at least one of reduction of nitrogen oxides by the reductive cleaning agent component or oxidative decomposition of organic solvent by the oxidative cleaning agent component,
    simultaneously detecting a variation of a constitutional ratio between the reductive cleaning agent component and the oxidative cleaning agent component with the progress of oxidation-reduction reaction,
    supplying correction gas when the constitutional ratio deviates from a predetermined control range, and
    restoring the constitutional ratio within the control range.

2. The cleaning process according to claim 1, wherein said variation of the constitutional ratio is detected by analyzing gas after passing through said cleaning agent or by analyzing gas sampled from downstream stratum of said cleaning agent.

3. The cleaning process according to claim 1, wherein said variation of the constitutional ratio is detected by sensing the color change of a detecting agent filled in downstream stratum of said cleaning agent, a detecting agent filled in a pipe at downstream side of said cleaning agent, or a detecting agent filled in a by-pass pipe disposed at downstream stratum of said cleaning agent.

4. The cleaning process according to claim 1, wherein said variation of the constitutional ratio is detected by the variation of the electric resistance of said cleaning agent.

5. The cleaning process according to claim 1, wherein said variation of the constitutional ratio is detected by the calculation from the treated amount of the exhaust gas.

6. The cleaning process according to claim 1, wherein said organic solvent is at least one kind selected from ethers, alcohols, ketones, esters and hydrocarbons each having boiling point at the temperature of 40° C. to 140° C. under ordinary pressure.

7. The cleaning process according to claim 1, wherein said correction gas is oxygen or air and converts metal into metal oxide.

8. The cleaning process according to claim 1, wherein said correction gas is oxygen or air and converts lower valent metal oxide into higher valent metal oxide.

9. The cleaning process according to claim 1, wherein said correction gas is one or more of hydrogen, ethers, alcohols, ketones, esters or hydrocarbons and converts metal oxide into metal.

10. The cleaning process according to claim 1, wherein said correction gas is one or more of hydrogen, ethers, alcohols, ketones, esters or hydrocarbons and converts higher valent metal oxide into lower valent metal oxide.

11. The cleaning process according to claim 1, wherein said constitutional ratio between metal and metal oxide is settled within the control range from 5/95 to 95/5 by mole ratio.

12. The cleaning process according to claim 1, wherein said constitutional ratio between lower valent metal oxide and higher valent metal oxide is settled within the control range from 5/95 to 95/5 by mole ratio.

13. The cleaning process according to claim 1, wherein said metal and said metal oxide are supported by an inorganic carrier.

14. The cleaning process according to claim 1, wherein said lower valent metal oxide and said higher valent metal oxide are supported by an inorganic carrier.

15. The cleaning process according to claim 1, wherein said cleaning is carried out at the temperature of from 100° C. to 800° C.

16. A cleaning process of exhaust gas which comprises the steps of:
    bringing at least two kinds selected from the exhaust gas containing nitrogen oxides and organic solvent, the exhaust gas containing nitrogen oxides and the exhaust gas containing organic solvent into contact alternatively or at random with a cleaning agent comprising metal as a reductive cleaning agent component and metal oxide as an oxidative cleaning agent component or comprising lower valent metal oxide as a reductive cleaning agent component and higher valent metal oxide as an oxidative cleaning agent component while heating them, conducting at least one of reduction of nitrogen oxides by the reductive cleaning agent component or oxidative decomposition of organic solvent by the oxidative cleaning agent component, simultaneously detecting a variation of a constitutional ratio between the reductive cleaning agent component and the oxidative cleaning agent component with the progress of oxidation-reduction reaction, supplying correction gas when the constitutional ratio deviates from a predetermined control range, and restoring the constitutional ratio within the control range.

17. The cleaning process according to claim 16, wherein said variation of the constitutional ratio is detected by analyzing gas after passing through said cleaning agent or by analyzing gas sampled from downstream stratum of said cleaning agent.

18. The cleaning process according to claim 16, wherein said variation of the constitutional ratio is detected by sensing the color change of a detecting agent filled in downstream stratum of said cleaning agent, a detecting agent filled in a pipe at downstream side of said cleaning agent, or a detecting agent filled in a by-pass pipe disposed at downstream stratum of said cleaning agent.

19. The cleaning process according to claim 16, wherein said variation of the constitutional ratio is detected by the variation of the electric resistance of said cleaning agent.

20. The cleaning process according to claim 16, wherein said variation of the constitutional ratio is detected by the calculation from the treated amount of the exhaust gas.

21. The cleaning process according to claim 16, wherein said organic solvent is at least one kind selected from ethers, alcohols, ketones, esters and hydrocarbons each having boiling point at the temperature of 40° C. to 140° C. under ordinary pressure.

22. The cleaning process according to claim 16, wherein said correction gas is oxygen or air and converts metal into metal oxide.

23. The cleaning process according to claim 16, wherein said correction gas is oxygen or air and converts lower valent metal oxide into higher valent metal oxide.

24. The cleaning process according to claim 16, wherein said correction gas is one or more of hydrogen, ethers, alcohols, ketones, esters or hydrocarbons and converts metal oxide into metal.

25. The cleaning process according to claim 16, wherein said correction gas is one or more of hydrogen, ethers, alcohols, ketones, esters or hydrocarbons and converts higher valent metal oxide into lower valent metal oxide.

26. The cleaning process according to claim 16, wherein said constitutional ratio between metal and metal oxide is settled within the control range from 5/95 to 95/5 by mole ratio.

27. The cleaning process according to claim 16, wherein said constitutional ratio between lower valent metal oxide and higher valent metal oxide is settled within the control range from 5/95 to 95/5 by mole ratio.

28. The cleaning process according to claim 16, wherein said metal and said metal oxide are supported by an inorganic carrier.

29. The cleaning process according to claim 16, wherein said lower valent metal oxide and said higher valent metal oxide are supported by an inorganic carrier.

30. The cleaning process according to claim 16, wherein the combination of said metal and said metal oxide is Cu and CuO, Ni and NiO, Ru and $RuO_2$ or Ag and $Ag_2O$.

31. The cleaning process according to claim 16, wherein the combination of said lower valent metal oxide and said higher valent metal oxide is MnO and $Mn_2O_3$, FeO and $Fe_2O_3$, CoO and $Co_2O_3$, CrO and $Cr_2O_3$, $MoO_2$ and $MoO_3$ or $Ce_2O_3$ and $CeO_2$.

32. The cleaning process according to claim 16, wherein said cleaning is carried out at the temperature of from 100° C. to 800° C.

* * * * *